United States Patent [19]

Kitagawa

[11] Patent Number: 5,026,602

[45] Date of Patent: Jun. 25, 1991

[54] MECHANICAL COMPONENT CONSISTING OF ANTI-STATIC MATERIAL

[75] Inventor: Hiroji Kitagawa, Nagoya, Japan

[73] Assignee: Kitagawa Industries Co., Ltd., Nagoya, Japan

[21] Appl. No.: 398,977

[22] Filed: Aug. 28, 1989

[30] Foreign Application Priority Data

Sep. 19, 1988 [JP] Japan ............................... 63-234293

[51] Int. Cl.[5] ............................................ B32B 15/08

[52] U.S. Cl. .................................... 428/336; 428/450; 428/461; 428/922; 428/926

[58] Field of Search ................ 271/109; 428/461, 457, 428/336, 450, 922, 926

[56] References Cited

U.S. PATENT DOCUMENTS 3,926,428 12/1975 Heldenbrand et al. ............ 271/109

FOREIGN PATENT DOCUMENTS 0081965 7/1982 European Pat. Off. ............ 428/922

2012529 1/1979 United Kingdom ................ 428/922

*Primary Examiner*—Thomas J. Herbert

*Attorney, Agent, or Firm*—Oliff & Berridge

[57] ABSTRACT

Anti-static conductive mechanical components of synthetic resin with a conductive membrane formed on the surface of the synthetic resin through evaporation. When static electricity is generated during the operation of the mechanical components, the conductive membrane, which can be used to ground the synthetic resin, quickly eliminates the static electricity. The equipment constructed from the mechanical components can thus prevent malfunctions caused by static electricity.

4 Claims, 1 Drawing Sheet

MECHANICAL COMPONENT CONSISTING OF ANTI-STATIC MATERIAL

BACKGROUND OF THE INVENTION

This invention relates to a mechanical component comprising anti-static material. The mechanical component is applied to equipment such as a copying machine, a facsimile machine, or an electrostatic plotter. Such equipment makes copies or draws charts using electrostatic adsorption.

Since mechanical components such as gears and pulleys are generally made of conductive metal, they require no static-prevention measures.

On the other hand, since drive belts, non-driven belts, paper-feed rollers, and the light carriages of a copying machine require some elasticity, they are made of synthetic resins such as silicon rubber or hard rubber. When mechanical components such as the drive belts and the paper-feed rollers are made from an insulating material like synthetic resin, friction generates static electricity on the surfaces of the mechanical components. Consequently, the related-art mechanical component is made of synthetic resin with conductive fillers such as carbon black or metallic particles mixed in so that the mechanical component does not become charged with static electricity.

However, a mechanical component made of synthetic resin containing conductive fillers will not have sufficient conductivity and will develop problems.

When carbon black is mixed into synthetic resin, the electric resistivity of the synthetic resin is reduced, but its mechanical strength is also reduced. The amount of carbon black added must be carefully regulated. When the maximum amount of carbon black is mixed into the synthetic resin, it is difficult to obtain the optimum resistivity for the synthetic resin. The optimum resistivity for preventing synthetic resin from being charged with static electricity is between $10^5$ and $10^9$ohm.cm. As the amount of carbon black increases, electric resistivity rapidly decreases from about $10^{10}$ohm.cm to about $10^2$ohm cm. Thus, it is difficult to optimally adjust the electric resistivity when mixing carbon black into synthetic resin.

The related-art conductive mechanical component, which is made of synthetic resin mixed with carbon black, has little static-prevention effect and may allow malfunctions of equipment that uses electrostatic adsorption. For example, when copying paper that has electrostatically adsorbed toner is fed by a paper-feed roller, either static electricity on the paper-feed roller strips the toner from the paper, or the paper sticks to the paper-feed roller.

Alternatively, the mechanical component can consist of synthetic resin with metallic particles mixed in. However, metallic particles, which differ from synthetic resin in specific gravity, cannot be distributed uniformly in the synthetic resin. For example, when a drive belt is made of synthetic resin mixed with metallic particles, the electric resistivity of the driven belt is inconsistent, and the drive belt remains partially charged with static electricity.

SUMMARY OF THE INVENTION

One object of this invention is to provide a conductive mechanical component that can eliminate static electricity without impairing the mechanical properties of synthetic resin as a base material for the mechanical component.

This object is achieved by this invention, which provides a mechanical component comprising an anti-static material. The mechanical component is characterized by a body of the mechanical component, and a conductive membrane on a surface of the body. The conductive membrane grounds the body.

DESCRIPTION OF THE PREFERRED EMBODIMENTS

Figure 1:
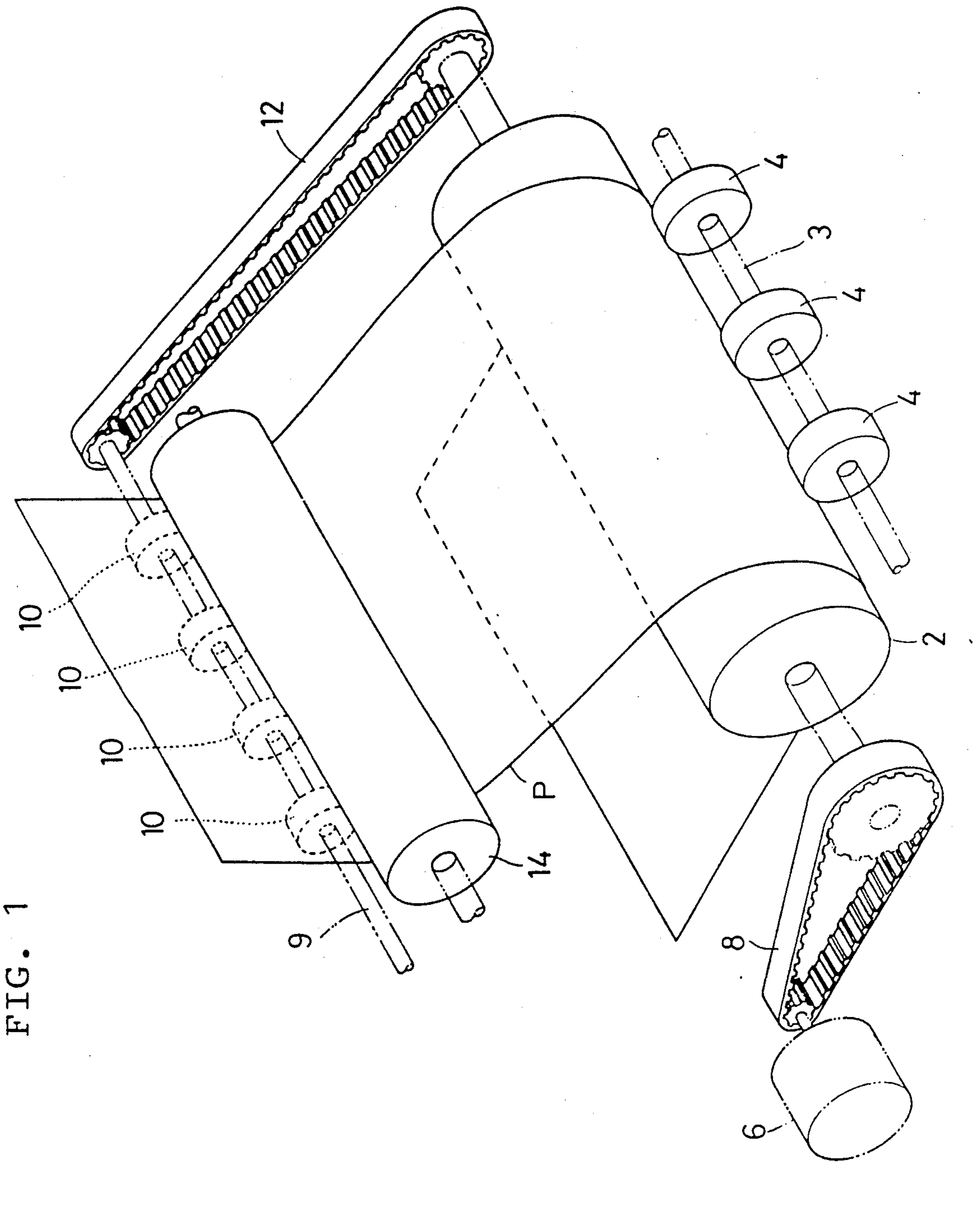
FIG. 1 is an illustration of mechanical components embodying this invention.

In this embodiment, conductive components are used to construct a paper-feed mechanism for a copying machine or a facsimile machine.

As shown in FIG. 1, a first paper-feed cylinder 2 is located opposite several auxiliary paper-feed rollers 4 set on a shaft 3. A first belt 8 transmits the rotation of a motor 6 and rotates the first paper-feed cylinder 2. Paper P is fed along the periphery of the first paper-feed cylinder 2. Subsequently, when the first paper-feed cylinder 2 rotates, a second belt 12 rotates several auxiliary paper-feed rollers 10 on a shaft 9, and paper P is fed upward between the auxiliary paper-feed rollers 10 and a second paper-feed cylinder 14.

The base material of the first paper-feed cylinder 2, the auxiliary paper-feed rollers 4 and 10, and the second paper-feed cylinder 14 is a silicon rubber that is formed in the shape of a cylinder or a ring by crosslinking high siloxane polymer. An aluminum layer about two microns thick is formed on the surface of the silicone rubber by means of evaporation. The surface resistivity of this aluminum layer is $8\times10^{-2}$ohm/cm$^2$.

Since the cylinders 2 and 14 and the rollers 4 and 10 have uniformly thick metallic layers formed on their surfaces through evaporation to provide a low, uniform surface resistivity, static electricity will not develop on them. In addition, since the surface resistivity is uniform, the surfaces of the cylinders 2 and 14 and the rollers 4 and 10 will not partially electrify, thus reliably preventing static problems. Consequently, the cylinders 2 and 14 and the rollers 4 and 10 will not become charged with static electricity, and paper P will not wrap around the first paper-feed cylinder 2, or stick between the first cylinder 2 and rollers 4 or between the second cylinder 14 and rollers 10. An electrostatic latent image formed on the paper P will not be disturbed by a charged body or a photosensitive drum (not shown) while the paper P is fed. Toner, which is electrostatically adsorbed on the electrostatic latent image, adheres to the paper P. The cylinders 2 and 14, and the rollers 4 and 10 feed paper and, at the same time, prevent the quality of copying from deteriorating.

On the other hand, the first belt 8 and the second belt 12 for rotating the cylinder 2 and the rollers 10, respectively, consist of neoprene rubber. A 1.5 micron thick titanium layer is evaporated onto the surfaces of the belts 8 and 12. The surface resistivity of the layer is $3\times10^{-1}$ ohm/cm$^2$.

As with the aluminum layers on the cylinders 2 and 14 and the rollers 4 and 10, the titanium surface layers protect the belts 8 and 12 from static electricity. The titanium layer is strong and durable.

The components of this embodiment such as the first and second paper-feed cylinders 2 and 14, the auxiliary paper-feed rollers 4 and 10, and the first and second belts 8 and 12 have superior mechanical strength and durability compared with the prior-art components containing carbon black. The first and second belts 8 and 12 always have a fixed tension, but strong material is used to improve the wear resistance of the belts 8 and 12.

Although a specific embodiment of the invention has been described for the purpose of illustration, the invention is not limited to this embodiment. This invention includes all embodiments and modifications that come within the scope of the claims. For example, this invention could be gears, pulleys, cams, light carriages for copying machines, V-belts, and other mechanical components. A body of the mechanical component could comprise silicone rubber, neoprene, and other kinds of synthetic rubber. A conductive membrane formed on the body could be made from aluminum or titanium. A two to four micron thick membrane is preferable because such a membrane is conductive without impairing the elasticity of the body. When the membrane is evaporated onto the body, ceramics can be added to enhance the strength of the membrane.

I claim:

1. A mechanical component comprising an anti-static material, comprising:

a roller comprised of synthetic rubber and having an elasticity;

a conductive metallic membrane on a surface of the roller such that he conductive metallic membrane grounds the roller, wherein the conductive metallic membrane is formed by evaporation, a thickness of the conductive metallic membrane being between about 1.5–4 μm so that the conductive metallic membrane does not impair the elasticity of said roller.

2. A mechanical component comprising an anti-static material, comprising:

a belt comprised of synthetic rubber and having an elasticity;

a conductive metallic membrane on a surface of the belt such that the conductive metallic membrane grounds the belt, wherein the conductive metallic membrane is formed by evaporation, a thickness of the conductive metallic membrane being between about 1.5–4 μm so that the conductive metallic membrane does not impair the elasticity of said belt.

3. A mechanical component as in claim 2 in which the metallic conductive membrane comprises titanium.

4. A mechanical component comprising an anti-static material according to claim 2, wherein said membrane further comprises ceramics.

* * * * *